(12) United States Patent
Colibert et al.

(10) Patent No.: US 8,328,221 B2
(45) Date of Patent: Dec. 11, 2012

(54) DISPLACEABLE FIFTH-WHEEL HITCH ASSEMBLY

(75) Inventors: Gregory J. Colibert, Salt Lake City, UT (US); Jacque Colibert-Clarke, Salt Lake City, UT (US)

(73) Assignee: Comco Manufacturing, Inc., Greensboro, NC (US)

( * ) Notice: Subject to any disclaimer, the term of this patent is extended or adjusted under 35 U.S.C. 154(b) by 78 days.

(21) Appl. No.: 13/008,877

(22) Filed: Jan. 18, 2011

(65) Prior Publication Data

US 2011/0169247 A1    Jul. 14, 2011

Related U.S. Application Data

(62) Division of application No. 12/075,803, filed on Mar. 12, 2008, now Pat. No. 7,871,096.

(60) Provisional application No. 61/004,016, filed on Nov. 20, 2007.

(51) Int. Cl.
*B62D 53/08* (2006.01)

(52) U.S. Cl. .................. 280/438.1; 280/441; 280/441.1; 280/901

(58) Field of Classification Search ............... 280/438.1, 280/439, 441, 441.1, 901
See application file for complete search history.

(56) References Cited

U.S. PATENT DOCUMENTS

| | | | | |
|---|---|---|---|---|
| 3,527,476 A | * | 9/1970 | Winckler | 280/423.1 |
| 3,826,516 A | * | 7/1974 | Weber | 280/407 |
| 5,707,070 A | * | 1/1998 | Lindenman et al. | 280/438.1 |
| 5,772,229 A | * | 6/1998 | Cattau | 280/438.1 |
| 5,839,745 A | * | 11/1998 | Cattau et al. | 280/434 |
| 6,485,045 B1 | * | 11/2002 | King | 280/417.1 |
| 7,198,282 B2 | * | 4/2007 | Burchett | 280/433 |
| 7,296,817 B1 | * | 11/2007 | Mann et al. | 280/438.1 |
| 2009/0160159 A1 | * | 6/2009 | Alguera | 280/438.1 |
| 2011/0057416 A1 | * | 3/2011 | Mann et al. | 280/438.1 |

* cited by examiner

*Primary Examiner* — Kevin Hurley
(74) *Attorney, Agent, or Firm* — Walter L. Beavers; Blake P. Hurt

(57) ABSTRACT

A method and apparatus for providing a displaceable fifth-wheel hitch assembly configured to be mounted in a bed of a truck. The displaceable fifth-wheel hitch assembly includes a platform track, a displaceable platform, and an adjustment assembly. The platform track defines a track space therein and is configured to be mounted in the bed of the truck. The displaceable platform is configured to be positioned in the track space and includes a fifth-wheel hitch coupled thereto. The adjustment assembly includes a means for displacing the platform and a means for locking the platform in place with respect to the platform track and truck. The means for locking the platform includes a locking pin that is spring biased into holes in the platform track. The means for displacing the platform includes an adjustment rod and bracket to displace the locking pin from its locking position.

19 Claims, 2 Drawing Sheets

DISPLACEABLE FIFTH-WHEEL HITCH ASSEMBLY

RELATED APPLICATIONS

This divisional application claims the benefit of U.S. application Ser. No. 12/075,803, filed Mar. 12, 2008, and entitled, "Displaceable Fifth-Wheel Hitch Assembly," now U.S. Pat. No. 7,871,096 issued 18 Jan. 2011, which application claims the benefit of U.S. Provisional Application Ser. No. 61/004,016, filed Nov. 20, 2007, and entitled, "Displaceable Fifth-Wheel Hitch Assembly," each of which are incorporated by reference in their entirety herein.

FIELD OF THE INVENTION

The present invention relates to hitches operable with a vehicle and a vehicle mounting assembly, and more particularly to fifth-wheel hitches.

BACKGROUND OF THE INVENTION AND RELATED ART

A fifth-wheel trailer is generally a large, high profile trailer which is coupled to a large towing vehicle, such as a large pick-up truck or other suitable vehicle. The fifth-wheel trailer is typically coupled to the towing truck or vehicle using a fifth-wheel hitch or a ball hitch, which, in the case of many conventional fifth-wheel hitches, is typically mounted to the towing vehicle, such as to the frame of a truck, and is made to couple directly to the fifth-wheel trailer.

One problem with towing a fifth-wheel trailer relates to the available space for movement of the fifth-wheel trailer with respect to the towing vehicle. Due to the limited amount of space in some towing vehicles, such as with short-bed pick-up trucks, towing of a fifth-wheel trailer is primarily limited to larger towing vehicles, such as long-bed pick-up trucks. Long-bed pick-up trucks provide a distinct advantage by reducing the likelihood of the front of the fifth-wheel trailer coming in contact with the cab when negotiating a sharp turn, such as a 90 degree turn or a u-turn. Furthermore, pick-up trucks having long-beds are generally more capable of carrying large loads as these vehicles typically come equipped with greater suspension and towing systems. Due to the clearance between the front of the fifth-wheel trailer and the cab of the pick-up truck, short-bed trucks have essentially been limited to towing from commonly known hitch systems located at the rear-end of the truck, thus excluding popular fifth-wheel trailers.

Nonetheless, there is quite a large market for short-bed vehicles due to their versatility, smaller turning radius and more compact nature. Further, many of the short-bed vehicles include suspension and towing capabilities sufficient to handle many existing fifth-wheel trailers. However, to couple to a ball hitch, fifth-wheel trailers must be designed to include what is known as a goose neck assembly. Many fifth-wheel trailers are not designed with this feature and are, therefore, incapable of coupling to a ball hitch.

It may be desirable even larger vehicles having adequate space in which a fifth-wheel trailer may move within to locate the point of connection of the fifth-wheel trailer at different locations relative to the vehicle, wherein the means for accomplishing this are user friendly and efficiently operated.

SUMMARY OF THE INVENTION

In light of the problems and deficiencies inherent in the prior art, the present invention seeks to overcome these by providing a displaceable fifth-wheel hitch assembly operable with a vehicle, wherein the displaceable fifth-wheel hitch assembly comprises a displacement assembly mountable within a vehicle, and a corresponding fifth-wheel hitch of one kind or another.

In accordance with the invention as embodied and broadly described herein, the present invention resides in a displaceable fifth-wheel hitch assembly comprising a displacement assembly having a stationary support coupled with the vehicle, and a movable support operable with the stationary support to permit displacement of the movable support in a bi-directional manner; a means for interfacing a fifth-wheel hitch with the movable support to enable the fifth-wheel hitch to displace in a bi-directional manner relative to the vehicle, a means for locking the movable support with respect to the stationary support, and a means for facilitating the displacement of the movable support and the fifth-wheel hitch.

The present invention also resides in a displaceable fifth-wheel hitch assembly configured to be mounted in the bed of a truck, comprising a platform track defining a track space; a platform configured to be positioned in the track space, to support a fifth-wheel hitch, and to permit bi-directional displacement of the fifth-wheel hitch relative to the platform track and the truck; an interface member that locates the fifth-wheel hitch in an elevated position above the platform track; and an adjustment assembly operable with the platform track to facilitate displacement of the platform and the fifth-wheel hitch, and to lock the platform and the fifth-wheel hitch in one of several positions.

The present invention further resides in a method for operating a fifth-wheel hitch with respect to a vehicle, the method comprising obtaining a displacement assembly mountable in a vehicle, the displacement assembly comprising a movable support operable to displace in a bi-directional manner; obtaining a fifth-wheel hitch; and relating the fifth-wheel hitch to the movable support of the displacement assembly to facilitate bi-directional displacement of the fifth-wheel hitch.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

Figure 1:
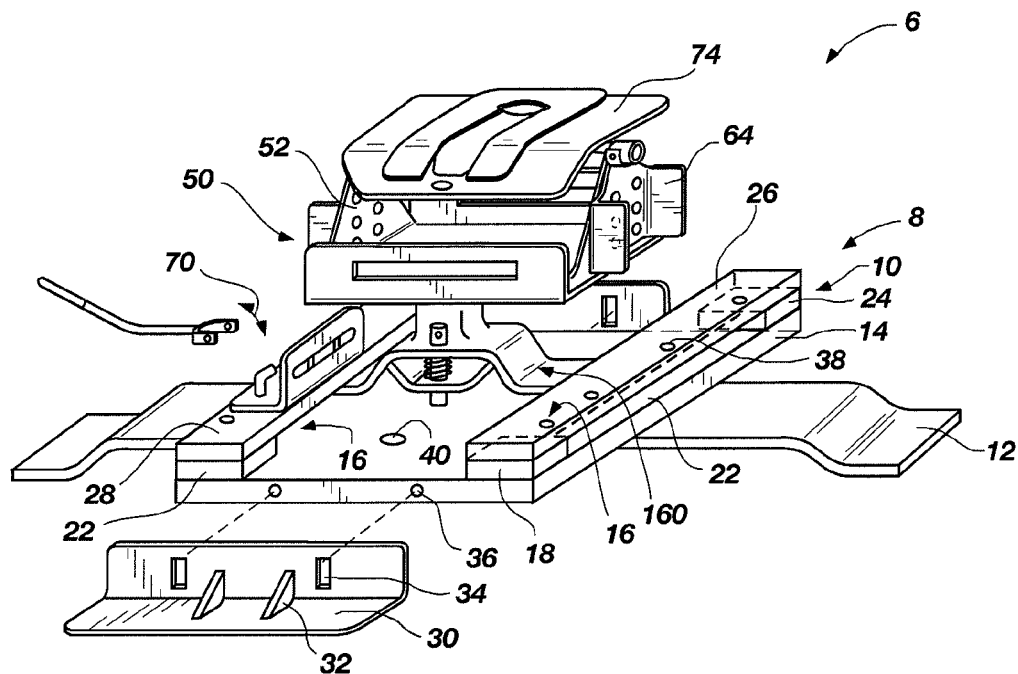
FIG. 1 illustrates a perspective view of a fifth-wheel hitch assembly including a platform track and a fifth-wheel hitch mounted on top of a platform through the use of a base and a riser according to an embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a method and system for enabling a towing vehicle, such as a long or short-bed truck, to tow a fifth-wheel trailer using a fifth-wheel hitch capable of being displaced, such as in a bi-directional manner, wherein the fifth-wheel hitch facilitates the selective location and relocation of the point of connection of the fifth-wheel trailer to the fifth-wheel hitch. For example, using a short-bed truck, the displaceable fifth-wheel hitch assembly may permit locating the fifth-wheel hitch, and therefore the fifth-wheel trailer and the point of connection between these, in a rearward direction prior to the short-bed truck negotiating a sharp turn, thereby providing the necessary clearance between the cab of the truck and the front of the fifth-wheel trailer.

Displacement of the fifth-wheel hitch may be achieved by mounting a stationary support in the bed of the towing vehicle that is operable with a movable support. The movable support may be coupled to the fifth-wheel hitch via an interfacing member. Displacement of the fifth-wheel hitch is facilitated through the use of an adjustment assembly comprising components capable of displacing the fifth-wheel hitch as needed or desired, and also selectively securing the fifth-wheel hitch in a secured position during towing.

The present invention provides several significant advantages over prior related fifth-wheel hitch assemblies and displaceable hitch assemblies, some of which are recited here and throughout the following more detailed description. First, the present invention enables a short-bed truck or other towing vehicles having small operating areas to tow a fifth-wheel trailer designed for use with a fifth-wheel hitch. Second, the present invention provides means for interfacing with proprietary and other fifth-wheel hitches, wherein said means for interfacing is operable with a movable support, thereby allowing bi-directional or other directional displacement of the fifth-wheel hitch in relation to the towing vehicle. Third, the present invention compensates for varying truck bed-liner surface configurations and thicknesses, enabling a fifth-wheel hitch to be used with any truck bed surface. Fourth, the present invention enables a fifth-wheel hitch to be supported regardless of the truck bed surface through the use of adjustable support brackets. Fifth, the present invention provides for vertical adjustment of a fifth-wheel hitch, allowing the fifth-wheel hitch to compensate for varying truck/fifth-wheel trailer configurations.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

With reference to FIGS. 1-6, illustrated is a fifth-wheel hitch assembly in accordance with one exemplary embodiment of the present invention. The fifth-wheel hitch assembly 6 comprises a fifth-wheel hitch 50 and a displacement assembly 8 mountable within a vehicle (not shown), such as the bed of a truck. The fifth-wheel hitch 50 comprises a head 74 operable with a base 52 and a head mounting plate 64.

The displacement assembly 8 comprises a stationary support and a movable support. In one exemplary embodiment the stationary support can include a platform track 10, as shown in FIG. 1, mounted in the bed of a truck (not shown), wherein the platform track 10 is mounted on top of a mounting bracket 12 coupled to the frame of the truck.

In one exemplary embodiment the movable support can include a platform 160, as shown in FIG. 1 operable with the stationary support to permit or facilitate displacement of the movable support, and operable with a fifth-wheel hitch, such as fifth-wheel hitch 50. The platform track 10 may be configured to define a track space 16 therein to allow guided and predictable movement of the platform 160, and therefore the fifth-wheel hitch 50 and fifth-wheel trailer (not shown), within and along the track space 16.

As indicated, the fifth-wheel hitch assembly 6 may be configured to be mounted to the towing vehicle, such as to a short-bed pick-up truck, using a vehicle hitch coupling system as commonly known in the art. In particular, the platform track 10 may be configured to be secured to the mounting bracket 12, which may be part of the vehicle hitch coupling system. The mounting bracket 12 may be concealed under the truck bed and secured to the chassis of the truck. An example of one particular type of vehicle hitch coupling system is disclosed in U.S. Pat. No. 5,246,244, which is incorporated by reference herein.

The platform track 10 can include a bottom plate 14, first and second upper plates 26 and 28 and one or more spacers disposed between and separating the bottom and upper plates (see spacers 18, 22, and 24). The platform track 10 can be made with the first and second upper plates 26 and 28 disposed over a top surface of the bottom plate 14 with each of the spacers sandwiched therebetween. In particular, the spacers 18 and 24 can be positioned on the top surface of the bottom plate 14 and substantially flush with the edges at each corner of the bottom plate 14. The length of the spacers 18 and 24 can be substantially the same as the width of the first and second upper plates 26 and 28. The spacer 22 may also be positioned on the top surface and extend lengthwise along first and second longitudinal sides of the bottom plate 14 and may be configured to be substantially flush with the first and second edges of the bottom plate 14. The width of the spacer 22 is sized smaller than the width of the first and second upper plates 26 and 28. The first and second upper plates 26 and 28 can then be positioned over each of the spacers so that the outer edges are flush with the outer edges of each of the spacers and the bottom plate 14 and the inner edges of the first and second upper plates 26 and 28 over hang past the inner edges of the spacer 22.

Each of the bottom plate 14, spacers and first and second upper plates 26 and 28 include holes 38 extending transversely therethrough configured to receive bolts for fastening each of the bottom and upper plates and spacers together, with the spacers sandwiched therebetween. With this arrangement, each of the spacers, the first and second upper plates 26 and 28, and the bottom plate 14 function to define a track space 16 formed within the platform track 10. The spacers 18 and 24 define ends of the track space 16, with the side spacers (see spacer 22), having a smaller sized width than the first and second upper plates 26 and 28, defining sides of the track space 16. The track space 16 is specifically designed to provide limited displacement or movement, in this case bi-directional displacement or movement, of the movable component, or platform 160.

Figure 4:
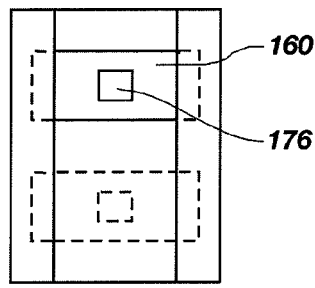
FIG. 4 illustrates a top view of the platform track, the platform, and the riser with the fifth-wheel hitch removed and with the platform being depicted in an upper and lower position.
Figure 5:
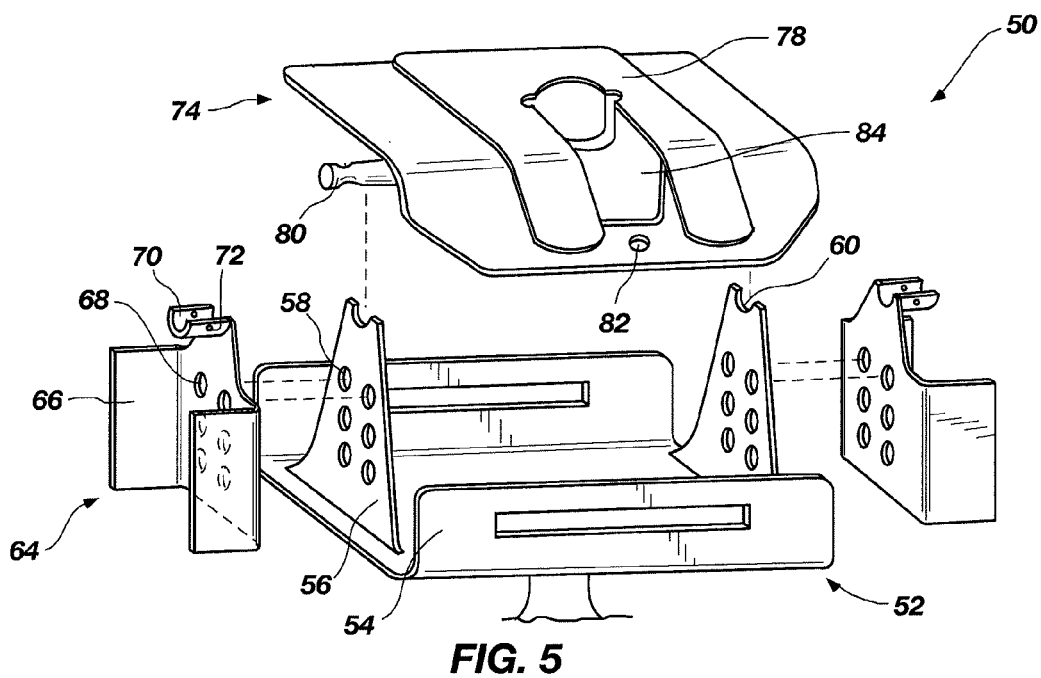
FIG. 5 illustrates an exploded view of a fifth-wheel hitch supported by the riser and consisting of a head, a head mounting plate, and a base with brackets according to the embodiment of the present invention.
Figure 6:
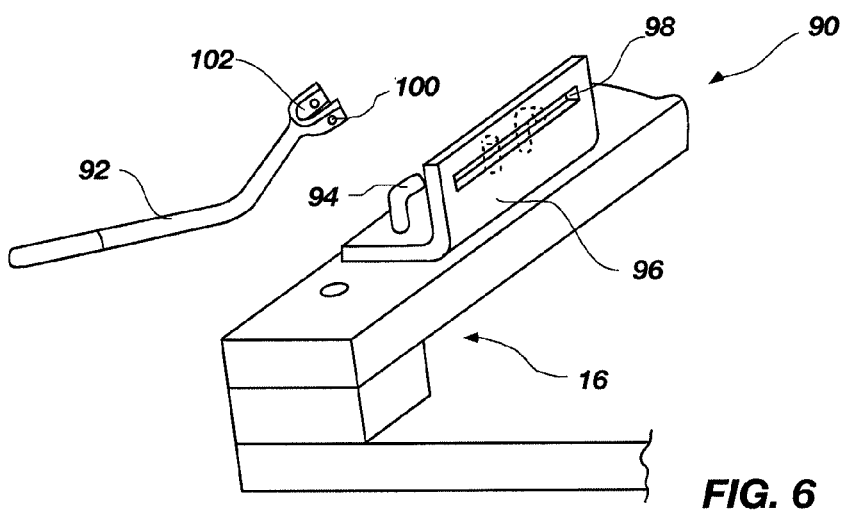
FIG. 6 illustrates a perspective view of a portion of an adjustment assembly, coupled to the platform track, consisting of the adjustment rod, the adjustment bracket including a window, and an adjustment hook according to the embodiment of the present invention.

The bottom plate 14 also include holes 40 extending therethrough configured to receive a locking pin 180 used to selectively locate and lock the platform 160 in either an first or upper position 120, a second or lower position 130, as shown in FIG. 4, or at any position between these. The bottom plate 14 further includes holes (see holes 36) formed in the front and back faces extending parallel with the longitudinal sides of the bottom plate 14 used for securing one or more support brackets (see support bracket 30) designed to adjust the height of the bottom plate 14 and the displacement assembly 8.

The platform 160 can be sized and configured to be positioned in the track space 16 of the platform track 10. The platform 160 can include a non-planar configuration having a raised portion 164 and a lower portion 168 (see particularly FIG. 3). The lower portion 168 can extend outward from opposing sides of the raised portion 164 to extend between the bottom plate 14 and the respective first and second upper plates 26 and 28 within the track space 16. In this manner, opposing ends of the lower portion 168 are contained within the track space 16 of the platform track 10. Further, with the lower portion 168 of the platform 160 disposed within the track space 16 of the platform track 10, the platform 160 is configured to slidably move in a bi-directional manner within the track space 16. Such track space can be lubricated with a grease type lubricant to reduce the friction between the platform 160 and the platform track 10. Any other suitable means of sliding movement can also be employed, such as with rollers, bearings, etc., as known to those skilled in the art.

The platform 160 can include an interfacing member such as a riser 176 extending upward from the raised portion 164 as a means for interfacing the fifth-wheel hitch 50 with the platform 160. The interfacing member serves to support and locate the fifth-wheel hitch 50 above the platform track 10 and to enable the fifth-wheel hitch 50 to displace or slidably move with the platform 160. Other means for interfacing the fifth-wheel hitch 50 and the platform 160 can be employed. One such embodiment can include coupling an interfacing member, such as the riser 176, to a platform having a planar configuration, which locates the fifth-wheel hitch above the platform track 10, wherein the platform is configured to be confined and slidably movable within the track space 16 defined by the platform track 10. Another such embodiment can include coupling the fifth-wheel hitch 50 directly to the platform 160 without the use of the riser 176. In any case, the fifth-wheel hitch 50 can be interfaced with the platform 160 or some other movable support by any method known to one of ordinary skill in the art to enable the fifth-wheel hitch 50 to move bi-directionally with the platform 160 or other support.

Figure 2:
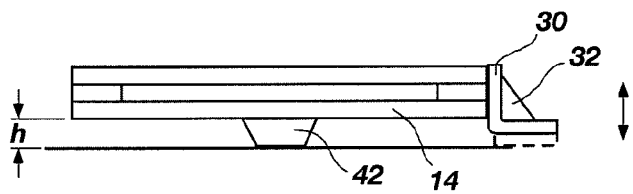
FIG. 2 illustrates a front view of a platform track with a spacer attached to the bottom of a platform track and a support bracket attached to the side of a platform track.

The displacement assembly 8, and particularly the platform track 10, can further include a spacer 42 operable with the bottom plate 14 that positions the platform track 10 above the truck bed (not shown) by a distance h, such as approximately one inch (see particularly FIG. 2).

The displacement assembly 8 can further include a support device such as a support bracket 30 mounted on one or both of the front and back of the platform track 10. The support bracket 30 can include ribs 32 to reinforce the support bracket 30, as well as slots 34 cut through the support bracket 30 in a manner that permits the bolting of the support bracket 30 to the bottom plate 14 using the holes 36 in the bottom plate 14. The slots 34 can be configured in a manner to allow the support bracket 30 to be adjusted in relation to the platform track 10. The slot configuration allows the support bracket 30 to be adjusted so the bottom surface of the support bracket 30 may be positioned at different elevational positions relative to the bottom surface of the bottom plate 14 (see the adjusted location of support bracket 30 in FIG. 2 permitting the bottom plate 14 to be elevated or located above the truck bed by a height h). In other words, adjusting the support bracket 30 functions to selectively vary the height of the platform track 10. The adjustability of the support bracket 30 allows the displacement assembly 8 to be able to compensate for varying truck bed surface configurations and thicknesses, such as an increased thickness caused by the presence of a bed liner (not shown), while also allowing the support bracket 30 to support the platform track 10 relative to the truck surface.

The platform 160 can include a riser 176, as previously set forth, that further couples to a fifth-wheel hitch 50. In the embodiment shown, the fifth-wheel hitch 50 comprises a base 52, a hitch mounting device, such as a head mounting plate 64, and a head 74. The base 52 can be coupled to the riser 176 through using any known means, such as welding, fastening (e.g., bolting), etc. The base 52 can be constructed to be approximately the same width as the bottom plate 14 and smaller in longitudinal length then the bottom plate 14, or any other size. The base can include lips 54 configured perpendicular to the base 52 and in a manner such as to create a frame allowing the base 52 to act as a platform to support the head 74. The lips 54 can be constructed by bending the base at ninety degrees or by some other suitable method. The base 52 can include brackets 56 substantially the same width as the inner portion of the frame created in the base 52 and configured in a manner to allow the brackets 56 to be rigidly attached to the bottom of the base 52 and to the inner sides of the lips 54, thus allowing the base and the lips to support the brackets 56. The brackets 56 can be configured to be taller than the lips 54 and substantially the same width as the frame created in the base 52 up to the height of the lips 54 and thereafter to narrow linearly to the top of the brackets 56. The brackets can include holes 58 cut transversely through the bracket 56 and a notch 60 cut at the top of the bracket.

The fifth-wheel hitch 50 can include a head mounting plate 64 that is used in conjunction with the base 52 to support the head 74. The head mounting plate 64 can include lips 66 similar to the lips 54 created in the base 52. The lips 66 can be created by bending the head mounting plate 64 ninety degrees or by some other suitable method thereby creating a channel in the head mounting plate 64 having a width less than the inner sides of the frame created in the base 52, such configuration thus permitting the head mounting plate 64 to fit within the frame of the base 52. The head mounting plate 64 can include holes 68 configured in a manner that provides for bolts to be placed through the holes 68 in the head mounting plate 64 and through the holes 58 in the brackets 56, allowing the head mounting plate 64 to be secured to the base 52 via mounting the head mounting plate 64 to the brackets 56. The holes 68 in the head mounting plate 64 and the holes 58 in the brackets 56 serve to allow the head mounting plate 64 to be adjusted in relation to the brackets 56. In this manner, the head mounting plate 64 can be raised or lowered in relation to the brackets 56 and in relation to the platform 160, and thereby can be used to raise or lower the head 74. Such configuration would allow the fifth-wheel hitch 50 to adapt to a variety of truck/fifth-wheel trailer configurations.

The head mounting plate 64 can also include a U-shaped channel 70 attached to the top of the head mounting plate 64. The U-shaped channel 70 can be configured such that when the head mounting plate 64 is attached to the bracket 56 at its lowest position in relation to the bracket, the size and shape of the U-shaped channel 70 is substantially the same as the notch 60 located at the top of the bracket 56. The U-shaped channel 70 is configured in such a way as to support the head 74 by cradling the hitch rod 80. The U-shaped channel 70 also includes a hole 72 configured in such a way as to allow a pin to be placed through the hole 72 to secure the head 74 in the U-shaped channel via securing the hitch rod 80 in the U-shaped channel 70.

The displacement assembly further comprises, as part of an adjustment assembly 90, a locking pin 180 that can be used in conjunction with the platform 160 as a type of latching mechanism to mechanically hold the movable platform 160 in place with respect to the platform track 10. The locking pin 180 and platform 160 comprise one exemplary means for locking the movable support with respect to the stationary support, and can be configured to facilitate a locking position in which the locking pin 180 is positioned within one of the holes 40 in the bottom plate 14, thereby locking the platform 160 with respect to the bottom plate 14 in one of several available positions (see FIG. 4), or any interim positions. In another example, shown in FIG. 3, the means for locking can include locking pin 184 that is biased by spring 184 into one of the holes 40 in the platform track 10. The platform 160 can be constructed to include a lower support 172 placed on the bottom side of the platform that offers support and stability to the platform 160 and that helps locate the position of the locking pin 180.

The platform 160 and lower support 172 can be further constructed to include a hole 166 cut through the platform 160 and the lower support 172 that allows the locking pin 180 to extend from above the top surface of the platform 160, through the platform and the lower support 172, and to rest on the top surface of the bottom plate 14 when the platform 160 is assembled with the platform track 10.

The locking pin 180 can include a clip 182 that is rigidly attached to the locking pin 180 and located on the locking pin 180 in a manner that allows the clip 182 to rest on the inner surface of the lower support 172 when the locking pin 180 is positioned through the hole 166 and the clip 182 is positioned between the inner surface of the raised portion 164 and the inner surface of the lower support 172 and when the locking pin 180 occupies its locking position. The platform 160 can include a spring 184 located between the inner surface of the raised portion 164 and the inner surface of the lower support 172 that is positioned in such a way that the top of the spring 184 rests on the inner surface of the raised portion 164 and the bottom of the spring 184 rests on the top surface of the clip 182, thus biasing the locking pin 180, and thus compelling the locking pin 180 into its locking position. The locking pin 180 can be further constructed to be operable and actuated via a manual adjustment rod, shown as adjustment rod 92. For example, the locking pin 180 may include a hole 186 cut through a portion thereof that is positioned above the top surface of the raised portion 164 and that allows the locking pin 180 to be coupled to the adjustment rod 92, as described below.

The locking pin 180, platform 160, lower support 172, and the holes 40 in the bottom plate 14 can be configured in a manner to allow the bottom surface of the locking pin 180 to slide along the top surface of the bottom plate 14 during displacement of the platform 160 until the locking pin 180 is positioned over one of the holes 40 in the bottom plate 14, at which moment the locking pin 180 is caused to be received and positioned in the hole 40 via the spring 184. Thus, the position of the platform 160 may be secured in one of several available positions, such as those shown in FIG. 4.

Figure 3:
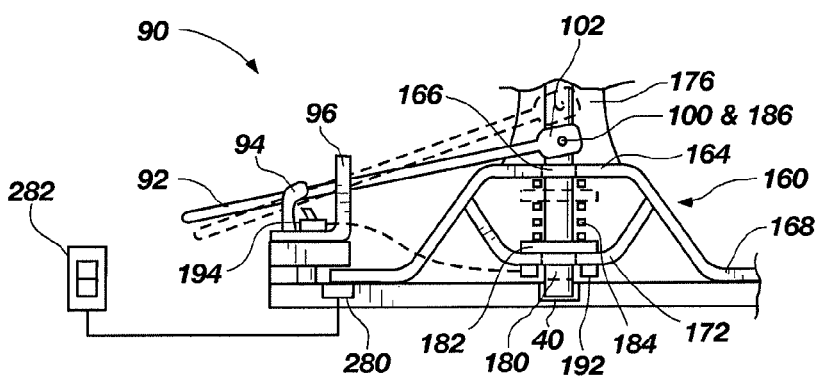
FIG. 3 illustrates a front view of a platform and an adjustment assembly, the platform being confined within the track space of the platform track and having a raised and lower portion, the adjustment assembly having a spring, a locking pin, an adjustment rod, and an adjustment bracket and depicting the displacement of the locking pin between two positions through the use of the adjustment rod and adjustment bracket according to the embodiment of the present invention.

Other means for locking the movable support with respect to the stationary support can be employed to lock the platform 160 in place with respect to the platform track 10. For example, as shown in FIG. 3, means for locking can comprise an electromagnet 280 embedded in the platform track 10 and coupled to an electric switch 282, wherein the electromagnet may be configured in a manner to electrically hold a platform made of electrically conductive material in place with respect to the platform track 10 when the electric switch is activated. It is contemplated that other systems and mechanisms may be used to lock the platform in place with respect to the platform track and which may be implemented and used with the displacement assembly, as will be recognized by those skilled in the art. As such, those described herein and shown in the drawings are not meant to be limiting in any way.

The adjustment rod 92 may be used in conjunction with an adjustment bracket 96 to facilitate the displacement of the platform 160 and fifth-wheel hitch 50. The adjustment bracket 96 may consist of angled steel or some other suitable material and may be coupled to the first or second upper plates 26 and 28 using bolts (not shown) or some other suitable means. The adjustment bracket 96 can include a slot or window 98 that permits the adjustment rod 92 to pass therethrough, and to engage and operate with the locking pin 180, thereby facilitating the actuation of the locking pin 180, namely displacing it from its locked position, as shown by the dashed outline in FIG. 3. Specifically, the bottom surface of the window 98 functions as a fulcrum point to permit the adjustment rod 92 to act as a lever that lifts the locking pin 180 enough to disengage the platform track 10.

The adjustment bracket 96 and window 98 can be constructed in a manner and coupled to the platform track 10 in such a way as to allow the adjustment rod 92 to access and engage the locking pin 180 with the platform 160 positioned in any of the several available locking positions. The adjustment rod 92 can further comprise a two pronged fork 102 at one end having a gap formed between the prongs suitable to receive the locking pin 180. The fork 102 can include a hole 100 through both prongs that permits a pin (not shown) to be placed through the fork, which fork facilitates the secure engaging of the locking pin 180 for manipulating the vertical displacement (e.g., engaging and disengaging) of the locking pin 180.

The displacement of the locking pin 180 from its locked position can be achieved by placing the adjustment rod 92 through the adjustment window 98, causing the fork 102 of the adjustment rod 92 to receive and engage the locking pin 180, aligning the hole 100 in the fork 102 with the hole 186 in the locking pin 180, placing a pin (not shown) through the hole 100 in the fork 102 and through the hole 186 in the locking pin 180, thus securing the separate pieces together, and applying a downward force on the other end of the adjustment rod 92. This action causes causing the rod 92 to pivot about the edge of the adjustment window 98 to lift the locking pin 180 from its locked position. With the locking pin 180 displaced from its locked position, a force may be applied to the platform 160 causing it to displace within the track space 16 and relocate to a new desired position.

As part of the adjustment assembly 90, the adjustment bracket 96 can include one or more adjustment hooks (see adjustment hook 94) coupled to the adjustment bracket 96 by welding or by some other suitable method. The adjustment hook 94 can be attached to the adjustment bracket 96 in such a way that the bottom of the hook is substantially at the same elevation or height as the top of the adjustment rod 92 when the adjustment rod 92 displaces the locking pin 180 from its locked position, as indicated by the dashed outline in FIG. 3. The adjustment hook 94 can also be attached in such a way that the adjustment rod 92 can be placed under the adjustment hook 94 and held in its location by the adjustment hook 94. In this manner, when the adjustment rod 92 displaces the locking pin 180 from its locking position, the adjustment rod 92 may be placed under the adjustment hook 94 and held in this upward position with the locking pin 180 displaced from its locked position. In essence, the adjustment hook 94 is configured to receive and engage the rod 92 and to permit the rod to maintain the locking pin 180 in a vertically displaced position, without manual assistance, and with the rod 92 applying a force that acts against and overcomes the spring force biasing the locking pin 180 in a downward position.

The adjustment hook 94 can also be configured in such a manner so as to allow the adjustment rod 92 and adjustment hook 94 to disengage upon displacement of the platform 160 from one position to another. Such a configuration would allow the adjustment rod 92 to still maintain the locking pin 180 in an upward, disengaged position until the locking pin clears the current hole upon displacement of the platform 160, but would also to allow the locking pin 180 to ride along the surface of the platform track 10 once the adjustment rod 92 releases from the adjustment hook 94. Upon displacement of the platform 160 in either direction, and upon release from the adjustment hook 94, the adjustment rod 92 slides along the adjustment bracket 96 within the adjustment window 98. As a hole within the bottom plate 14 of the platform track 10 is reached, the locking pin 180 would automatically snap into place within the hole as a result of the spring 184 used to bias the locking pin 180.

Other means for facilitating the engaging and/or disengaging of the locking pin 180 can also be employed. For example, as shown in FIG. 3, an electronic device 192, such as a solenoid, can be coupled to the platform 160 and configured to work with an electronic switch 194 that is mounted on the platform track 10 or in some other suitable location. The solenoid can be configured in a manner to displace the locking pin 180 from its locked position when activated. The electronic switch can activate the solenoid and displacing the locking pin 180 from its locked position. With the locking pin 180 displaced from its locked position, a force may be applied to the platform 160 to cause it to displace within the track space 16. Once the platform 160 is in a desired position, the electronic switch can be deactivated, which in turn deactivates the solenoid and returns the locking pin 180 into its new locked position.

According to the embodiment of the displacement assembly set forth above, a fifth-wheel hitch can be operated with a towing vehicle in the following manner. A displacement assembly 8 is obtained that includes a platform track 10 and a platform 160. The platform track is secured to the vehicle using the mounting bracket 12. A fifth-wheel hitch 50 is obtained and related to the platform by securing the base 52 to the riser 176 or by some other suitable method. The fifth-wheel hitch 50 and displacement assembly 8 are then operated with the platform 160, and thus the fifth-wheel hitch 50, locked in one of several available positions via the locking pin 180, until it is desired that the fifth-wheel hitch 50 be positioned in a new position. At this time, the adjustment rod 92 is placed through the window 98 of the adjustment bracket 96 and attached to the locking pin 180. A downward force is applied to the other end of the adjustment rod 92 to displace the locking pin 180 from its locked position. The adjustment rod 92 is then held in place with the locking pin 180 removed from its locked position by placing the adjustment rod 92 under the adjustment hook 94. During the displacement of the fifth-wheel hitch 50, the adjustment rod 92 becomes unhooked from under the adjustment hook 94 and the spring 184 compels the locking pin 180 onto the surface of the bottom plate 14 via the clip 182. The locking pin 180 moves slidably with the platform 160 along the surface of the bottom plate 14 until it encounters one of the holes 40 located in the bottom plate 14, at which time the locking pin 180 is received into the hole 40 and the platform 160 and fifth-wheel hitch 50 are locked in the new position. The preceding process may be repeated to locate and relocate the platform 160 and the fifth-wheel hitch 50 to any available position.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed is:

1. A method for operating a fifth-wheel hitch with respect to a vehicle, the method comprising:
   obtaining a displacement assembly with an electronic activation means mountable in a vehicle, the displacement assembly comprising a movable support operable to displace in a bi-directional manner;
   obtaining a fifth-wheel hitch; and
   relating the fifth-wheel hitch to the movable support of the displacement assembly to facilitate bi-directional displacement of the fifth-wheel hitch.

2. The method of claim 1, further comprising adjusting the movable support to locate the fifth-wheel hitch in one of a plurality of positions.

3. The method of claim 1, further comprising locking the movable support to secure the fifth-wheel hitch in one of a plurality of positions.

4. The method of claim 1 wherein obtaining a displacement assembly comprises the step of obtaining a displacement assembly with a stationary support, said stationary support operable with the movable support.

5. The method of claim 4 further comprising the step of obtaining a movable support having a locking means.

6. The method of claim 4 further comprising the step of locking the movable support relative to the stationary support.

7. The method of claim 1 wherein obtaining a displacement assembly further comprises the step of obtaining a riser operable with the movable support.

8. A method for operating a displaceable fifth-wheel hitch assembly with respect to a vehicle to permit displacement of a fifth-wheel hitch, the method comprising:
   a) obtaining a displacement assembly mountable in a vehicle, the displacement assembly comprising a movable support operable to displace in a bi-directional manner, a stationary support operable with the movable support and coupled to the vehicle, and an electronic locking activation means that facilitates the displacement of the movable support;
   b) obtaining a fifth-wheel hitch; and
   c) relating the fifth-wheel hitch to the movable support to facilitate bi-direction of the fifth-wheel hitch.

9. The method of claim 8 further comprising the step of adjusting the movable support to locate the fifth-wheel hitch in one of a plurality of positions.

10. The method of claim 8 further comprising the step of locking the movable support to secure the fifth-wheel hitch in one of a plurality of positions.

11. The method of claim 8 further comprising the step of obtaining a riser operable with the movable support to locate the fifth-wheel hitch above the movable support.

12. A method for operating a displaceable fifth-wheel hitch assembly with respect to a vehicle, the method comprising:
   obtaining a displacement assembly mountable in a vehicle, the displacement assembly comprising a movable support operable to displace in a bi-directional manner;
   obtaining a fifth-wheel hitch;
   obtaining a platform track defining a track space therein, the platform track being mountable in a bed of the vehicle;
   obtaining a displaceable platform positioned in the track space that supports a fifth-wheel hitch, and permits bi-directional displacement of the fifth-wheel hitch relative to the platform track and the vehicle;
   obtaining an interface member that locates the fifth-wheel hitch in an elevated position above the platform track;
   obtaining an adjustment assembly operable with the platform track to facilitate displacement of the platform and the fifth-wheel hitch, and to lock the platform and the fifth-wheel hitch in one of a plurality of positions, the adjustment assembly comprising a pin assembly operable with the platform to lock the fifth-wheel hitch in one of a plurality of positions, the pin assembly comprising a locking pin biased by a spring pressing against a clip in a manner to permit the locking pin to move between a locking position and an unlocking position with the locking pin biased toward the locking position; and
   relating the fifth-wheel hitch to the movable support of the displacement assembly to facilitate bi-directional displacement of the fifth-wheel hitch.

13. The method of claim 12 further comprising the step of obtaining a spacer operable with the platform track and configured to locate the platform track above the bed of the vehicle.

14. The method of claim 12 further comprising the step of obtaining a support device operable with the platform track and configured to support the platform track with respect to the vehicle.

15. The method of claim 14 wherein obtaining the support device comprises the step of obtaining a support device having at least one adjustable bracket that adjusts perpendicular to the platform track to contact the vehicle and provide support to the platform track.

16. The method of claim 12 further comprising the step of obtaining a hitch mounting device operable with the platform and configured to permit bi-directional displacement of the fifth-wheel hitch in a direction perpendicular to a surface of the bed of the vehicle.

17. The method of claim 16 wherein obtaining the hitch mounting device comprises the step of obtaining a hitch mounting device having a base operable with the platform and a head mounting plate operable with the fifth-wheel hitch and configured to allow the head mounting plate to couple to the base and to displace bi-directionally in relation to the base.

18. The method of claim 12 wherein the step of obtaining an interface member comprises the step of obtaining an interface member having a riser coupled to the platform and configured to support the fifth-wheel hitch in an elevated position above the platform.

19. A method for operating a fifth-wheel hitch with respect to a vehicle, the method comprising the steps of:
   obtaining a displacement assembly mountable in a vehicle positioned on a track, the displacement assembly comprising a movable support operable to displace in a bi-directional manner, an adjustment assembly to lock the displacement assembly in one of a plurality of positions, and a pin with a clip rigidly affixed;
   obtaining a fifth-wheel hitch;
   providing an interface member to locate the fifth-wheel hitch in an elevated position above the platform track;
   releasing the pin from a locked position; and
   relating the fifth-wheel hitch to the movable support of the displacement assembly to facilitate bi-directional displacement of the fifth-wheel hitch.

\* \* \* \* \*